Nov. 11, 1952  R. L. LEHMANN ET AL  2,617,822
METHOD OF MANUFACTURE OF CERTAIN ARYL ACETIC ACIDS
Filed Sept. 26, 1950  2 SHEETS—SHEET 1
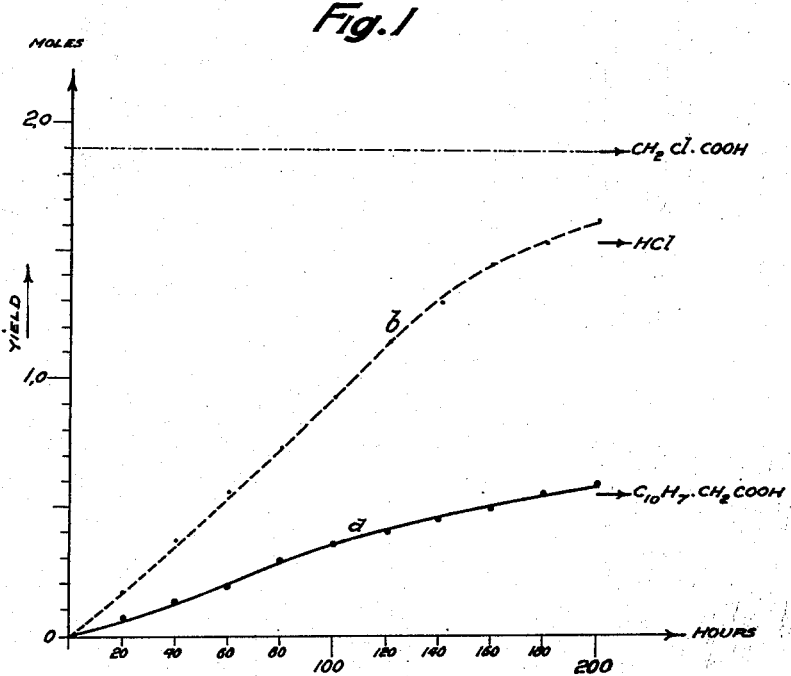
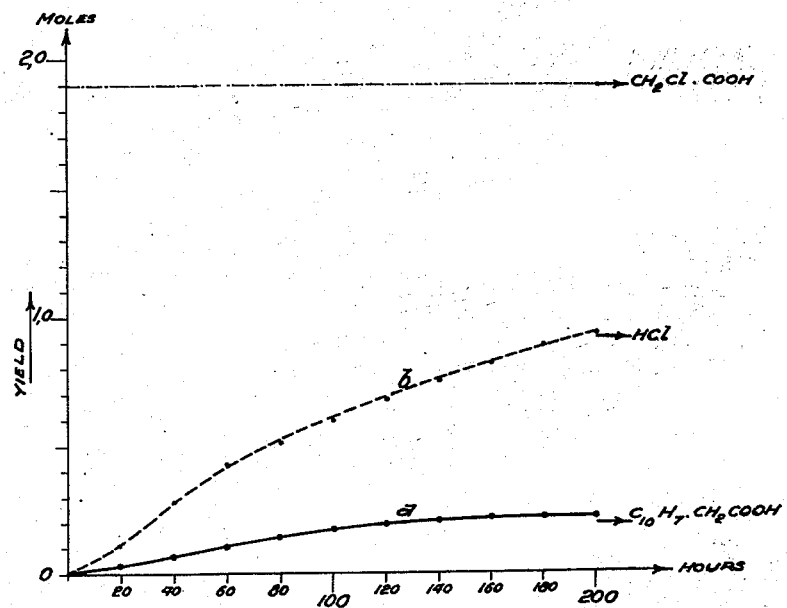
INVENTORS.
RENE LEON LEHMANN
AND JOSEF LINTNER,
BY Allen & Allen
ATTORNEYS.

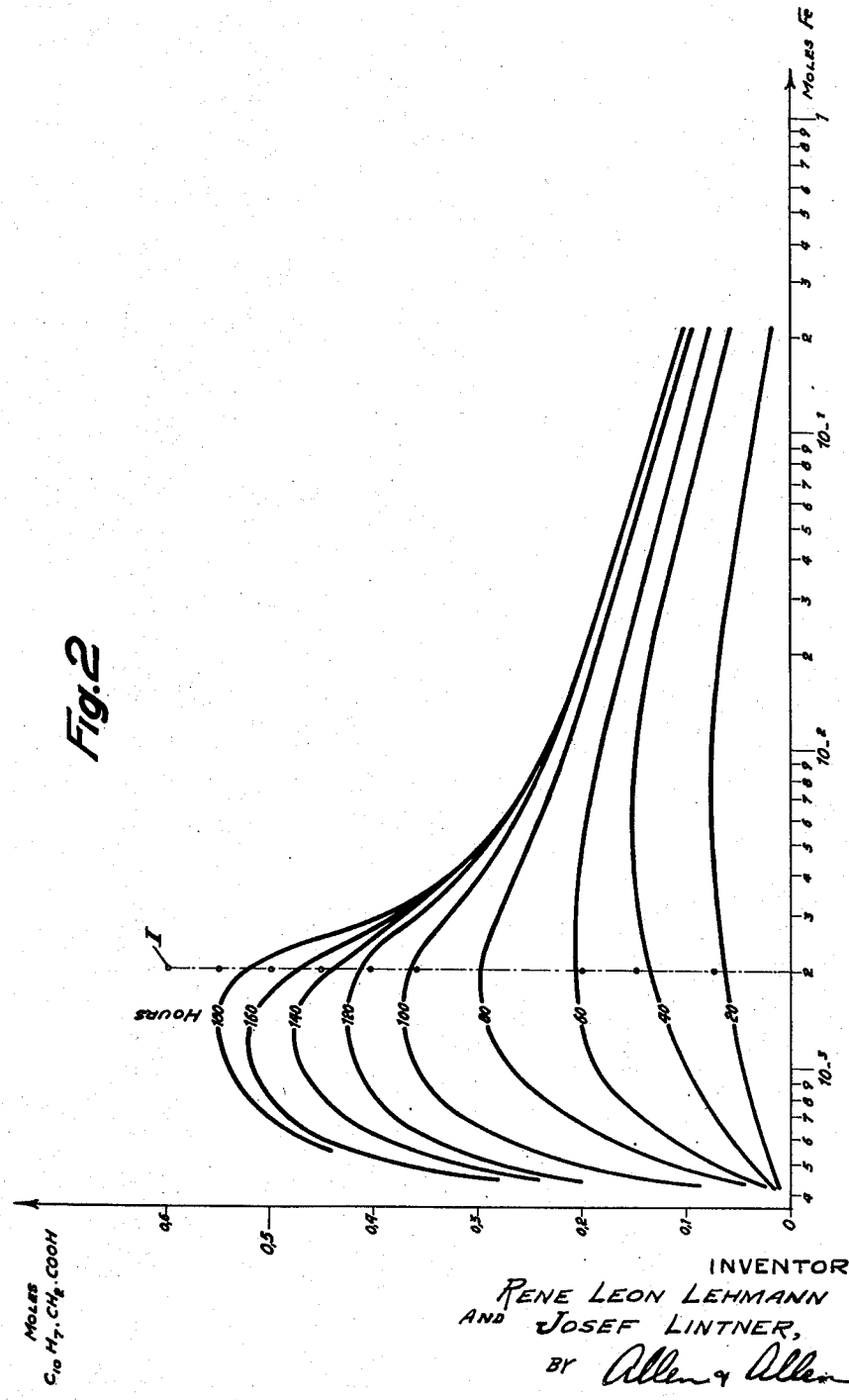

Patented Nov. 11, 1952

2,617,822

UNITED STATES PATENT OFFICE 2,617,822

METHOD OF MANUFACTURE OF CERTAIN ARYL ACETIC ACIDS

René Léon Lehmann, Paris, and Josef Lintner, La Garenne Colombes, France, assignors to Bozel-Maletra, Paris, France, a corporation of France Application September 26, 1950, Serial No. 186,786
In France December 20, 1947

8 Claims. (Cl. 260—515)

It is known that it is possible to prepare the α-naphthylacetic acid through a direct reaction between the naphthalene and the monochloracetic acid. According to the U. S. Patent 1,951,686 a mixture of naphthalene and monochloracetic acid is heated to temperature of 165 to 185° C. and thus a condensation of the monochloracetic acid with the naphthalene is obtained with an escape of hydrochloric acid. But one can see that the condensation described in the U. S. Patent 1,951,686 is successful only in very rare cases; more particularly, it does not lead to the desired resgult when the starting materials which are used are pure: the pure naphthalene and the pure monochloracetic acid may be heated to the mentioned temperatures during practically unlimited periods of time without giving rise to the production of a substantial escape of hydrochloric acid and without substantial formation of α-naphthylacetic acid.

If a simple condensation of a halogented alkyl on an aromatic nucleus with an escape of the corresponding halogenated acid following the typical reaction of Friedel-Crafts were to be considered in the present case, it must be possible to accelerate the reaction through an addition of anhydrous aluminium chloride or, possibly, of iron chloride; the quantities of metallic chloride which are necessary would be, in this case, of the order of magnitude of the molecular quantities with respect to the halogenated alkyl. Now, if such quantities of aluminium chloride or, possibly, iron chloride are added to the reaction mixture and if said mixture is heated a substantial increase of the escape of hydrochloric acid is found, but the formation of α-naphthylacetic acid is insignificant and tarry products are obtained which are insoluble in the alkalies.

It was found that it is possible, according to the method of the present invention, to exert a favourable influence upon the condensation of the naphthalene and of the monochloracetic acid through an addition of small quantities of the compounds of heavy metals which in the conditions of the reaction are converted into corresponding metallic chlorides. Mostly, the shape under which these metallic compounds are added to the reaction mixture is without any particular influence upon the course of the reaction, but, generally, the aqueous solutions of the metallic salts give the best yields; the organic salts such as those of the acetic acid or of the monochloracetic acid come in second line, whereas, for example, the anhydrous metallic chlorides such as those which are used for the reaction of Friedel-Crafts give the worst yields of α-naphthylacetic acid.

As regards the metallic ion itself it was formed by the applicant that a large number of metals have the property of exerting a more or less favourable influence on the reaction of condensation between the naphthalene and the monochloracetic acid. As a characteristic property these metals must only fulfill this condition, as it seems to appear according to the observations of the applicant, that they form through the action of their chlorides on the monochloracetic acid in the conditions of the reaction complex compounds which are generally characterized in the course of the dissolution of the metallic chlorides in the monochloracetic acid by the appearance of a darker coloration in the monochloracetic acid. It is known that metallic compounds capable of forming such complexes are especially those of the metals which in the periodical system of the elements pertain to the groups of the transition elements with multiple valences and with an incomplete underlayer; among these elements iron distinguishes itself by its tendency to such complexes. Now, according to the constatations of the applicant the metals of the above mentioned groups are precisely those which under the above indicated conditions preferably act as catalysts in the method according to the invention and among these metals, iron, more particularly, lends itself especially well to act as a catalyst in the present reaction.

Apart from the character of the catalyst its concentration has also a great importance for carrying out the method according to the invention. As it will be fully indicated hereinafter for the example of iron there exists for every metallic chloride a rather limited concentration interval within which the catalysts exerts a favourable influence upon the formation of the α-naphthylacetic acid. When working with too low concentrations one will practically find one-self in a situation which is identical with that of the working without any catalyst such as that of the U. S. Patent 1,951,686. On the contrary, if the catalyst is used with a too high concentration the increase of the quantity of catalyst effectively determines an acceleration of the escape of hydrochloric acid but instead of α-naphthylacetic acid tarry products which are soluble only with difficulty or insoluble in most solvents are formed. Thus, every metal is characterized by an optimum concentration with which it yields the best results as regards as well the reaction velocity as the yields. This optimum concentration lies approximately between $10^{-4}$ and $10^{-1}$ mole of compound of the active metal per mole of monochloracetic acid. For iron the optimum value is of the order of $10^{-3}$ mole of iron salt per mole of monochloracetic acid. A metal may generally be considered as a catalyst which is all the more active for carrying out the method which forms the subject-matter of the invention than the concentration of this metal corresponding to the maximum velocity of formation of the α-naphthylacetic acid is lower.

With the method in accordance with the invention it is, however, not only possible to fix an acetic rest on the naphthalene, but, if one works in the presence of a sufficient excess of monochloracetic acid in the reaction mixture, it is also possible to make naphthyldiacetic acid. A mixture of α-naphthylacetic acid and naphthyldiacetic acid is then obtained; these products can readily be separated since, on the one hand, the boiling point of the naphthyldiacetic acid methyl ester is higher than that of the α-naphthylacetic methyl ester and, on the other hand, the naphthyldiacetic acid methyl ester is very difficultly soluble in cold alcohol in contradistinction with the α-naphthylacetic acid methyl ester which is very readily soluble even in cold alcohol, which also renders possible the separation of this latter through dissolution and re-crystallization.

Instead of naphthalene it is also possible to use similar hydrocarbons such as the benzene, the acenaphthene or the anthracene, this latter having, however, already a lower reactivity than the naphthalene or the acenaphthene.

Instead of the monochloracetic acid itself it is possible, of course, also to resort to all those of its derivatives, which, in the conditions of the reaction, i. e. in heat and in the presence of water and hydrochloric acid, yield monochloracetic acid, for example: the anhydride of the monochloracetic acid or its mixed anhydrides or its esters.

For carrying out the method the necessary quantity of catalytically active metal, preferably as a chloride, a chloracetate or acetate in an aqueous solution is added to the monochloracetic acid, its anhydride or one of its esters. Instead of adding such an aqueous solution to the monochloracetic acid, it is also possible to mix a small quantity of water with the same and then to dissolve therein the metal or a metallic compound capable of being converted into a chloracetic under the action of the monochloracetic acid, for example the hydroxide or the carbonate. The monochloracetic acid and catalyst mixture is then heated while stirring during a certain time to 140–160° C. and the necessary quantity of hydrocarbon, naphthalene for example, is finally introduced. The temperature is then progressively raised to the boiling point of the monochloracetic acid and, simultaneously, the water contained in the reaction mixture is separated by distillation. In order to facilitate the removal of the water by distillation it is advisable to form an azeotropic mixture by means of benzene, of trichlorethylene or of similar bodies. In measuring as the monochloracetic acid is consumed by the reaction the boiling point of the reaction mixture rises progressively so that when the heating is continued the temperature rises little by little in a corresponding manner in measuring as the reaction proceeds up to about 200–210° C. As soon as the escape of hydrochloric acid ceases the hot mixture resulting from the reaction is poured while strongly stirring into an aqueous caustic soda lye or into an aqueous suspension of magnesia whereafter the mixture is still heated while stirring during a few hours and, finally, the insoluble parts are separated by filtration when cold. The filtrate is then acidified with hydrochloric acid; the precipitated α-naphthylacetic acid is expurgated of its liquid, washed with water and dried.

This application is a continuation-in-part of application S. N. 50,876, filed September 23, 1948.

*Example 1*

Trivalent iron monochloracetate was dissolved while heated and while stirring into 1.9 mole i. e. 185 grams of monochloracetic acid; after introduction of 3.75 moles i. e. 480 grams of naphthalene the reaction mixture was then heated to 180–185° C. while stirring. The quantity of escaping hydrochloric acid was continuously checked; on the other hand, samples were taken regularly from the reaction mixture in order to follow the quantitative formation of α-naphthylacetic acid depending on the time. The appended Figure 1 is a graph comprising two curves $a$ and $b$ respectively showing the yields of α-naphthylacetic acid and HCl obtained depending on the time for an iron concentration of $2 \times 10^{-3}$ mole for 1.9 mole of monochloracetic acid.

The same test was effected in the presence of variable iron concentrations, all the other conditions remaining the same; for each iron concentration which was used the corresponding number of moles of α-naphthylacetic acid which was formed was plotted as an ordinate in the graph shown at Figure 2. Each curve represents the results which are obtained in the presence of variable iron concentrations for a different and well predetermined duration of the reaction. The curve which corresponds to the longest duration of the reaction gives the total yield in α-naphthylacetic acid formed for each selected iron concentration. Thus, the dotted line designated by $l$ in Figure 2 which corresponds to an iron concentration of $2 \times 10^{-3}$ reproduces the values obtained in the graph of Figure 1.

These curves show clearly that in the case of iron there is a net maximum of catalytic activity for a concentration of about $10^{-3}$ iron mole per mole of monochloracetic acid. If the iron concentration is reduced to about $10^{-4}$ mole the yield in α-naphthylacetic acid drops to a small fraction of the yield obtained with $10^{-3}$ mole of iron. In a similar manner, the yield in α-naphthylacetic acid is reduced in the measure as the iron concentration increases; for a concentration of $10^{-2}$ mole of iron this yield is about half that which is obtained with a concentration of $10^{-3}$ mole of iron.

*Example 2*

$2 \times 10^{-3}$ mole of anhydrous ferric chloride were dissolved while heated in 1.9 mole of monochloracetic acid. After introduction of 3.75 moles, i. e. 480 grams of naphthalene the reaction mixture was then heated to 180–185° C. while stirring, as in Example 1. The escaping hydrochloric acid and the α-naphtylacetic acid which was formed were periodically measured; the measured quantities were plotted in the gram shown at Figure 3 in which the curves $a$ and $b$ respectively indicate the yields of α-naphthylacetic acid and in HCl obtained depending on the time for a concentration of $2 \times 10^{-3}$ mole of $FeCl_3$.

*Example 3*

A mixture containing 37.6 grams of monochloracetic acid and 0.585 gram of an aqueous solution of ferric chloride containing 24 grams of iron per litre is prepared, which is then heated while stirring to 150-160° C. during about 5 hours; 51 grams of naphthalene are then introduced therein and the whole is heated to 190-195° C. In the course of this heating the water is removed from the reaction mixture and in order to facilitate the dehydration, preferably 0.5 part by weight of benzene or trichlorethylene is added. In this case the water is removed by distillation in the form of an azeotropic mixture; the organic solvent is preferably continuously returned to the reaction mixture. As soon as the temperature of the reaction mixture reaches about 185 to 190° C. a strong escape of hydrochloric acid is initiated. In the measure as the concentration between the monochloracetic acid and the naphthalene proceeds and as the boiling point of the reaction mixture rises, simultaneously, in a corresponding manner, the temperature is raised progressively to 200 to 210° C. After about 30 hours the escape of hydrochloric acid is terminated; the reaction mixture which is still hot is then poured while strongly stirring into a suspension of about 18 to 20 parts of magnesia in from 500 to 800 parts of water. The aqueous suspension is still heated while stirring during one to two hours at about 80-90° C. Then the mixture is allowed to decant; the liquid floating on the surface of the slush becomes clear; it is separated through syphoning. The slush remaining in the vessel is empasted with water and then separated in a filter-press. The filtrate is united with the decanted liquid and this mixture is then acidified while cold while stirring with hydrochloric acid. The α-naphthylacetic acid then precipitates in the shape of fine needles which are almost white; it is separated through dehydration, washed with water and dried under vacuum. The so obtained yield is of 40 parts by weight of α-naphthylacetic acid.

*Example 4*

34.5 grams of the anhydride of the monochloracetic acid are mixed with 0.585 gram of a ferric chloride solution containing 24 grams of iron per litre and then heated during 5 to 10 hours while stirring to 140-160° C.; 51 parts by weight of naphthalene are then introduced and the operation is continued as in Example 3; the elaboration of the α-naphthlyacetic acid which forms also follows the same process as in Example 3.

*Example 5*

48.3 grams of monochloracetic acid ethyl ester are mixed with 0.585 gram of a ferric chloride solution containing 24 grams of iron per litre and then heated during 5 to 10 hours to 140-160° C. while stirring; 51 parts by weight of naphthalene are then introduced and the operation is continued as in Example 3; the elaboration of the α-naphthylacetic acid which forms also follows the same process as in Example 3.

*Example 6*

A mixture of 94.5 grams of monochloracetic acid and 0.5 gram of ferric chloride is held at 165° C. during 24 hours; 308 grams of molten acenaphthene are then introduced and the mixture is heated to 180° C. during 48 hours. During this period the escape of hydrochloric acid is 0.73 mole. The reaction product is poured on magnesia, crushed and ground after cooling and then extracted with boiling water. The filtered solution yields through acidification 100.5 grams of 5- acenaphthene-acetic acid having a melting point of 181° C.

*Example 7*

$2 \times 10^{-3}$ mole of ferric chloracetic were dissolved in 189 grams, i. e. moles of monochloracetic acid. The mixture was then heated to 180° C. and then such a quantity of benzene was added that a keen boiling occurred. The benzene separated through distillation is condensed in a cooler and continuously returned to the boiling mixture. The simultaneous escape of hydrochloric acid yielded 0.103 mole after 24 hours. For the separation of the phenylacetic acid from the reaction mixture the major part of the monochloracetic acid was first removed through distillation, then the residue of the distillation was treated when boiling with a suspension of magnesia in water. Then the whole was filtered and the phenylacetic acid was precipitated through acidification of the solution. An acid was obtained which was almost white and the melting point of which is 75° C. with a yield corresponding to about 4% of the quantity of hydrochloric acid which escaped.

*Example 8*

1728 grams of naphthalene and 1275 grams of monochloracetic acid are maintained at 185° C. during 24 hours in the presence of 40 grams of a ferric chloride solution containing 24 grams of iron per litre. Then 1275 grams of monochloracetic acid are added anew and the temperature is raised progressively to 200° C. in 24 hours. The total escape of hydrochloric acid is then 24.5 moles. The reaction product is distilled in order to expel the monochloracetic acid and the non-reacted naphthalene therefrom. The residue is treated with a suspension of magnesia in water; the solution is filtered while cold and the filtrate is precipitated through hydrochloric acid. The mixture of the obtained acids (α-naphthylacetic acid + 1-5 naphthylacetic acid) is esterified through methyl alcohol; the esters are separated through fractioning under vacuum.

The 1-5 naphthylacetate of methyl is saponified through a solution of caustic soda and the 1-5 naphthyldiacetic acid is then precipitated through hydrochloric acid; a white acid is obtained which melts at 315° C. while decomposing. The so obtained yield is 510 grams of α-naphthylacetic acid and 327 grams of 1-5 naphthylacetic acid.

*Example 9*

First 0.1 gram of powdered iron and then 0.06 gram of chromium hydroxide were dissolved in 181 grams of molten monochloracetic acid. After heating during about 24 hours at about 160° C. while strongly stirring 480 grams of naphthalene were introduced and the mixture was brought to 180-186° C. while stirring. After a heating of 77 hours the collected quantity of hydrochloric acid is 18 grams. A distillation is then effected the residue of which was treated at 95-100° C. with a suspension of magnesium oxide in water during 2 hours while strongly stirring. After cooling the insoluble part was separated through filtration and the alpha-naphthylacetic acid was precipitated in the filtrate through acidification with hydrochloric acid. The filtered and dried alpha-naphthylacetic acid represents 30 grams; its melting point is 128-129° C.

Example 10

11.5 grams of manganese carbonate were heated while stirring with 180 grams of monochloracetic acid, the major part of the manganese carbonate thus being dissolved. After heating at about 160° C. during about 24 hours while strongly stirring, 480 grams of naphthalene were introduced and the mixture was brought to a temperature of about 180° C. during 100 hours. During this operation 13 grams of hydrochloric acid escaped. The non-converted starting materials were then distilled under a normal pressure; the residue of the distillation was poured onto finely powdered hydrated magnesia and the whole was well mixed.

After cooling the mass was ground and extracted with water.

After filtration of the insoluble part the α-naphthylacetic acid was precipitated in the filtrate through hydrochloric acid and then expurgated of its liquid and dried. The obtained alpha-naphthylacetic acid is snow white and has a melting point of 127–128° C.

Example 11

11 grams of nickel carbonate were dissolved while stirring in 180 grams of monochloracetic acid. After a heating of about 24 hours at about 160° C. while strongly stirring, 480 grams of naphthalene were introduced and the mixture was brought while stirring well to 180–183° C. during 100 hours, 14 grams of hydrochloric acid escaping during this operation. The non-converted starting materials were then distilled under a normal pressure; the residue of the distillation was poured onto finely ground slacked lime and the whole was mixed well. The so obtained mass was then treated as in Example 1, which yielded 10 grams of alpha-naphthylacetic acid the melting point of which is 128–129° C.

Example 12

13.9 grams of chromium hydroxide were dissolved while stirring and heating in 180 grams of monochloracetic acid. After heating at about 160° C. during about 24 hours while strongly stirring, 480 grams of naphthalene were introduced and the mixture was brought to 180–185° C. during 100 hours. 33 grams of hydrochloric acid escaped during this operation; the residue of the distillation was then treated at 95–100° C. with a suspension of magnesia in water during 2 hours while stirring strongly. After cooling the insoluble part was separated through filtration and the alpha-naphthylacetic acid was precipitated in the filtrate through acidification with hydrochloric acid. The obtained alpha-naphthylacetic acid has a melting point of 127–128° C. The formation of secondary tarry products was particularly small in this case.

Example 13

1.8 grams of powdered cobalt (80 mesh) were dissolved in 180 grams of monochloracetic acid. After a heating of about 24 hours at about 160° C. while strongly stirring at about 160° C. 480 grams of naphthalene were added and the mixture was brought to 185–195° C. while stirring. After a heating of 96 hours the quantity of hydrochloric acid which had escaped was of 19 grams. The whole was then distilled and the residue of the distillation was treated as indicated in Example 12. After precipitation of the acid, filtration and drying and α-naphthylacetic acid was obtained the melting point of which is 128° C.

Example 14

1 gram of titanium tetrachloride was dissolved in 285 grams of monochloracetic acid. After heating at 160° C. during about 24 hours while strongly stirring 576 grams of naphthalene were introduced and the mixture was brought to 185–190° C. After a heating of 48 hours the quantity of hydrochloric acid which had escaped was 26 grams. The whole was then distilled and the residue of the distillation was treated as indicated in Example 13. After precipitation of the acid, filtration and drying, an α-naphthylacetic acid was obtained the melting point of which is 128° C.

Example 15

1 gram of zirconium chloride in an aqueous hydrochloric acid solution was introduced into 285 grams of monochloracetic acid. After a heating of 50 hours at 165° C. 384 grams of naphthalene were introduced and the mixture was brought to 187–191° C After a heating of 94 hours the quantity of hydrochloric acid which escaped was 81 grams. The whole was then distilled and the residue of the distillation was treated as indicated in Example 12. After precipitation of the acid, filtration and drying, an alpha-naphthylacetic acid was obtained the melting point of which was 128–129° C.

Example 16

0.05 mole of cerium is dissolved in 1 mole of monochloracetic acid. 1.9 mole of naphthalene are then added and the mixture is heated to 180° C. After 10 hours the hydrochloric acid which had escaped was 0.53 mole. The major part of the monochloracetic acid and of the naphthalene was removed from the reaction mixture and extracted by distillation; the residue of the distillation was then treated while heating and stirring through an aqueous suspension of magnesia. After filtration the α-naphthylacetic acid which had formed was separated from the filtrate through precipitation by means of hydrochloric acid.

Example 17

0.530 gram of platinum tetrachloride and 2 grams of water were introduced into 236 grams of molten monochloracetic acid; the mixture was then heated to 160° C. during 30 hours. 320 grams of naphthalene were then added and the temperature of the reaction mixture was brought to about 185° C. After a reacting of 40 hours the total quantity of hydrochloric acid which had escaped reached 0.24 mole. The major part of the monochloracetic acid and of the naphthalene was extracted through distillation; the residue of the distillation was then treated while heating and stirring through an aqueous suspension of magnesia. After filtration the α-naphthylacetic acid which had formed was separated from the filtrate through precipitation by means of hydrochloric acid.

We claim:

1. A method for the manufacture of arylacetic acids by condensing one of the hydrocarbons of the group consisting of naphthalene, benzene, acenaphthene, and anthracene with one of the chlorinated compounds of the group consisting of monochloracetic acid, esters, anhydride and mixed anhydrides of said acid, which comprises heating for several hours at high temperature while stirring said hydrocarbon with said chlorinated compounds in the presence of an iron catalyst in an amount between $10^{-4}$ to $2 \times 10^{-3}$ moles per mole of alkylating agent.

2. A method for the manufacture of arylacetic acids by condensing one of the hydrocarbons of the group consisting of naphthalene, benzene, acenaphthene and anthracene with one of the chlorinated compounds of the group consisting of monochloracetic acid, esters, anhydrides and mixed anhydrides of said acid, which comprises heating for several hours at high temperature while stirring said hydrocarbon with said chlorinated compound in the presence of a catalyst selected from the group consisting of iron, manganese, nickel, chromium, cobalt, titanium, zirconium, cerium and platinum, in an amount between $10^{-4}$ and about $7 \times 10^{-3}$ moles per mole of alkylating agent.

3. A method for the manufacture of naphthylacetic acid by condensing naphthalene with one of the chlorinated compounds of the group consisting of monochloracetic acid, esters, anhydrides and mixed anhydrides of said acid, which comprises heating for several hours at high temperature while stirring said hydrocarbon with said chlorinated compound in the presence of an iron catalyst in an amount between $10^{-4}$ and $2 \times 10^{-3}$ moles per mole of alkylating agent.

4. A method for the manufacture of naphthylacetic acid by condensing naphthalene with one of the chlorinated compounds of the group consisting of monochloracetic acid, esters, anhydrides and mixed anhydrides of said acid, which comprises heating for several hours at high temperature while stirring said hydrocarbon with said chlorinated compound in the presence of a catalyst selected from the group consisting of iron, manganese, nickel, chromium, cobalt, titanium, zirconium, cerium and platinum, in an amount between $10^{-4}$ and about $7 \times 10^{-2}$ moles per mole of alkylating agent.

5. A method for the manufacture of arylacetic acids by condensing one of the hydrocarbons of the group consisting of naphthalene, benzene, acenaphthene, and anthracene with one of the chlorinated compounds of the group consisting of monochloracetic acid, esters, anhydrides and mixed anhydrides of said acid, which comprises heating for several hours at high temperature while stirring said hydrocarbon with said chlorinated compound in the presence of a manganese catalyst in an amount on the order of about $5 \times 10^{-2}$ moles per mole of alkylating agent.

6. A method for the manufacture of arylacetic acids by condensing one of the hydrocarbons of the group consisting of naphthalene, benzene, acenaphthene, and anthracene with one of the chlorinated compounds of the group consisting of monochloracetic acid, esters, anhydrides and mixed anhydrides of said acid, which comprises heating for several hours at high temperature while stirring said hydrocarbon with said chlorinated compound in the presence of a nickel catalyst in an amount on the order of about $5 \times 10^{-2}$ moles per mole of alkylating agent.

7. A method for the manufacture of arylacetic acids by condensing one of the hydracarbons of the group consisting of naphthalene, benzene, acenaphthene, and anthracene with one of the chlorinated compounds of the group consisting of monochloracetic acid, esters, anhydrides and mixed anhydrides of said acid, which comprises heating for several hours at high temperature while stirring said hydrocarbon with said chlorinated compound in the presence of a chromium catalyst in an amount on the order of about $7 \times 10^{-2}$ moles per mole of alkylating agent.

8. A method for the manufacture of arylacetic acids by condensing one of the hydrocarbons of the group consisting of naphthalene, benzene, acenaphthene, and anthracene with one of the chlorinated compounds of the group consisting of monochloracetic acid, esters, anhydrides and mixed anhydrides of said acid, which comprises heating for several hours at high temperature while stirring said hydrocarbon with said chlorinated compound in the presence of a cobalt catalyst in an amount on the order of about $2 \times 10^{-2}$ moles per mole of alkylating agent.

RENÉ LÉON LEHMANN.
JOSEF LINTNER.

REFERENCES CITED

The following references are of record in the file of this patent:

Adams et al., "Organic Reactions," (Wiley), vol. III, pages 2, 3, 21–55, (1946).